(12) United States Patent
Goleshchikhin

(10) Patent No.: US 10,296,375 B1
(45) Date of Patent: May 21, 2019

(54) METHOD OF FAST FILE TRANSFER ACROSS NETWORK

(71) Applicant: Plesk International GmbH, Schaffhausen (CH)

(72) Inventor: Denis Goleshchikhin, Novosibirsk (RU)

(73) Assignee: Plesk International GmbH, Schaffhausen (CH)

( * ) Notice: Subject to any disclaimer, the term of this patent is extended or adjusted under 35 U.S.C. 154(b) by 161 days.

(21) Appl. No.: 15/687,456

(22) Filed: Aug. 26, 2017

(51) Int. Cl.
*G06F 9/48* (2006.01)
*G06F 16/13* (2019.01)

(52) U.S. Cl.
CPC ............ *G06F 9/4856* (2013.01); *G06F 16/13* (2019.01)

(58) Field of Classification Search
CPC ................................ G06F 9/4856; G06F 16/13
See application file for complete search history.

(56) References Cited

U.S. PATENT DOCUMENTS

| | | | | |
|---|---|---|---|---|
| 2005/0027892 A1* | 2/2005 | McCabe | ............... | G06F 3/0626 709/253 |
| 2012/0136945 A1* | 5/2012 | Lee | ..................... | H04L 67/2838 709/206 |
| 2014/0181039 A1* | 6/2014 | Harrison | ............... | G06F 3/0608 707/652 |

* cited by examiner

*Primary Examiner* — Wing F Chan
*Assistant Examiner* — Billy H Ng
(74) *Attorney, Agent, or Firm* — Bardmesser Law Group (57) ABSTRACT

System for transferring files includes source and target servers. A client on target server initiates data transfer by sending requests to agent on source server, including local path to data. Number of requests equals number of connections. Agent receives requests, uploads data from local storage and transfers data to client. Client receives data and stores it locally. File transfer process has multiple file copy operations. Each operation is executed by multiple parallel and independent procedures. File data and metadata are transferred between procedures via limited size queues, in random order. Each procedure is blocked when adding data to queue when queue reaches maximum size, or when queue is empty and not marked closed. The file list generation procedure asynchronously launches copies of itself to generate list of files in parallel. Agent reads next file from the list only when all blocks of current file are distributed between the copy procedures.

12 Claims, 9 Drawing Sheets

METHOD OF FAST FILE TRANSFER ACROSS NETWORK

BACKGROUND OF THE INVENTION

Field of the Invention

The present method relates to mass file transfer from a source server to a target server via a network.

Description of the Related Art

The need for mass file transfer via a network arises when it is required to move large amounts of data from server to server, i.e., to transfer files from the local storage of a source server to the local storage of a target server. The problem frequently arises in the context of server migration, e.g., migration of a physical or a virtual server (such as a webserver or a mail server) from a source machine to a target machine. A modern trend of ever increasing amounts of data is well known, with users frequently maintaining very large amounts of data on their servers (whether email data/attachments, video or image data), which need to be migrated. Since copying of data takes most of the time of the data transfer, it is critical that its speed be increased. The essential drawback of existing schemes provided by current known systems is their inefficient and incomplete use of resources, which results in slower data transfer.

Conventional file transfer means include local file copying utilities, such as cp (UNIX), xcopy, robocopy, SyncToy (WINDOWS). Local copying utilities can be used to transfer files via a network if network file systems are also used, e.g., NFS (UNIX) or SMB (WINDOWS). The common drawback of these utilities, even if they operate in multi-threaded mode, like robocopy, is that they have to perform low-level operations, such as opening, reading and writing of files and folders, in the network file system. The problem is, that such operations take much more time to be performed in network file systems than they do in local file systems, which results in slower data transfer.

rsync utility (UNIX) is another example. It does not use network file systems, and all low-level operations are performed locally: by rsync in Agent mode run on the source server, and by rsync in Client mode run on the target server. Yet, this utility performs all operations in succession using a single network connection, which results in slower data transfer.

Accordingly, there is a need in the art for a faster mechanism of file transfer across networks.

SUMMARY OF THE INVENTION

The object of the invention is to increase the speed of transferring data from a source server to a target server via a network.

The proposed method relates to identifying separate operations from the entire file transfer process between servers, so that these operations can be performed in parallel. The main operations are: creating a file list, reading file contents, compressing data, encrypting data, sending data, receiving data, decrypting data, unpacking data, creating files and writing their contents. All these operations are performed through separate procedures, and typically each operation is performed through several procedures working in parallel. To synchronize parallel procedures, queues of limited size are used. When the queue limit is reached, procedures that add more elements to the queue are blocked. If the queue is empty and was not marked as "closed", procedures that remove elements from the queue are blocked. To increase the speed of data transfer via a network, several network connections can be used at once. When several operations are performed simultaneously, it is possible to utilize the resources, such as the CPU, disk subsystem, network, to the fullest (or to a level defined by the admin), which will result in faster file transfer.

On the source server, the required operations are performed by an Agent program, and on the target server, the required operations are performed by a Client program.

The Agent program is run on the source server. It receives requests from the Client to transfer files having a specified path. Each network connection established when receiving a request is then used to transfer data to the Client. Network connections established when receiving requests containing the same path are pooled, wherein this network connection pool is used to transfer data to the Client in parallel. The first request in the series of requests containing the same path initiates the creation of a queue pool and triggers the pool of parallel procedures that perform all operations needed.

File list creation procedures perform recursive search for files/folders starting from the given path, and to the levels below. Reading procedures upload file contents in units of specified maximum length. The file list for reading is generated from the queue of files found, while units that have been read are queued again. Before going on to the next file, all undistributed (up to this point) units of the current file have to be distributed among procedures. The data units from the reading queue are compressed through compression procedures, and then are queued again. The data units from the compression queue are encrypted through encryption procedures, and then are queued yet again. Finally, the data units from the encryption queue are transferred via a network to the Client through data transfer procedures that use the connection pool generated when the Agent was receiving requests from the Client.

The number of data transfer procedures equals the number of pooled connections. Instead of encrypting data units, they can be transferred via secure connections, e.g., using SSL/TLS protocol, wherein the data is actually encrypted through data transfer procedures.

The Client is run on the target server and sends several file transfer requests to the Agent, wherein files share the same specified path. All network connections established through said requests are then used to receive the data from the source server. The data is received through data reception procedures, the number of which equals the number of established connections. Data units that are received are queued. The data units from this queue are decrypted through decryption procedures and then are queued again. When secure connections are used, the data is actually decrypted through reception procedures. The data units from the decryption queue are unpacked through unpacking procedures and then are queued yet again. Finally, writing procedures create files and folders, where file contents are written with the data obtained from the unpacked data units. Writing procedures take into account the fact that the Agent program transfers data in random order.

In another embodiment, a system for transferring files includes a source server having a local source data storage; and a target server having a local target data storage and connected to the source server via a network. An agent program runs on the source server, and a client program runs on the target server. The client program initiates a data transfer by sending several successive requests to the agent program, the requests including a path to data to be transferred on the local source data storage. A number of the requests equals the number of network connections used to receive the data from the source server. The agent program receives the requests from the client program, uploads the data from the local source data storage and transfers the data via the network to the client program. The client program receives the data from the agent program and stores the data on the local target data storage. The file transfer process is divided into multiple file copy operations. All the file copy operations are performed through separate procedures. Each file copy operation is executed by multiple procedures working in parallel and independent of each other. Parts of each file and the file metadata are transferred between the procedures via limited size queues, with the queues being arranged arbitrarily and in no particular order relative to each other. Each procedure is blocked when it adds data to a queue when the queue reaches a maximum predetermined size. Each procedure is blocked when it attempts to extract data from the queue if the queue is empty and not marked as closed. The agent program initiates a file list generation procedure to define a list of files to be transferred, with the file list generation procedure asynchronously launching copies of itself to generate the list of files in parallel. The agent program reads a next file from the list of files only when all blocks of a current file is distributed between the file copy procedures.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
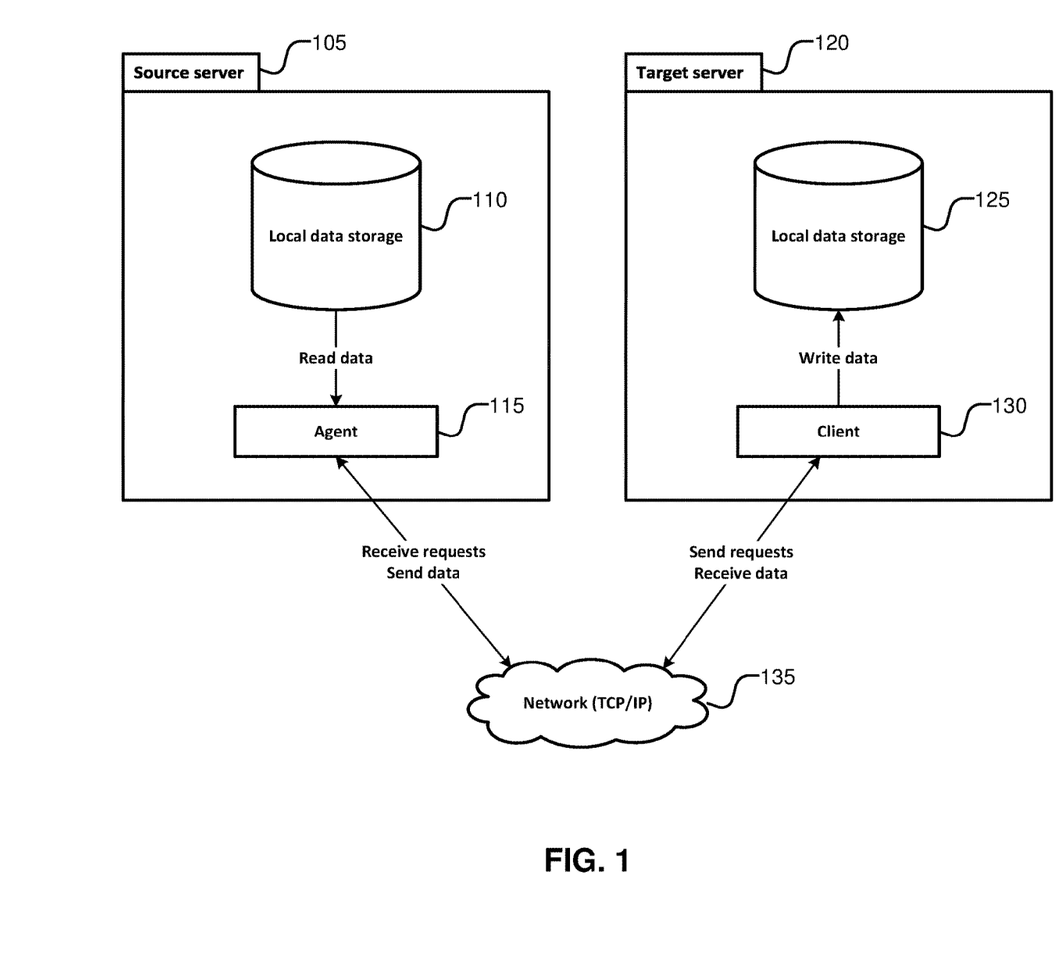
FIG. 1 shows interaction between the Agent and Client programs during mass transfer of files from a source server to a target server via a network.

FIG. 1 illustrates interactions between components in the proposed system and method. The objective is to transfer a set of files from a local data storage 110 on a source server 105 to a local data storage 125 on a target server 120 via a network 135. While doing so, resources of the hardware (the source server, the target server and the network) can be optimized—for example, if network bandwidth is available, but the CPU is overloaded, there is no need to compress the data—and vice versa. The level of compression can also be varied (which relates to the CPU load), as can the disk load and the network load). To implement this, the source server 105 runs the Agent program 115, and the target server 120 runs the Client 130 program. The Client 130 initiates the data transfer by sending several successive requests to the Agent program 115, containing the path to the data to be transferred, located on the source server 105. The number of requests equals the number of network connections, which will be used to receive the data from the source server 105.

The Agent program 115 receives the requests from the Client 130, then locates the data requested in the local storage 110, then uploads and transfers them back to the Client 130. In its turn, the Client 130 puts the data received into the local storage 125 on the target server 120. Having completed the data transfer, the Agent program 115 closes network connections, thus notifying the Client 130 that the data transfer has been completed.

Figure 2:
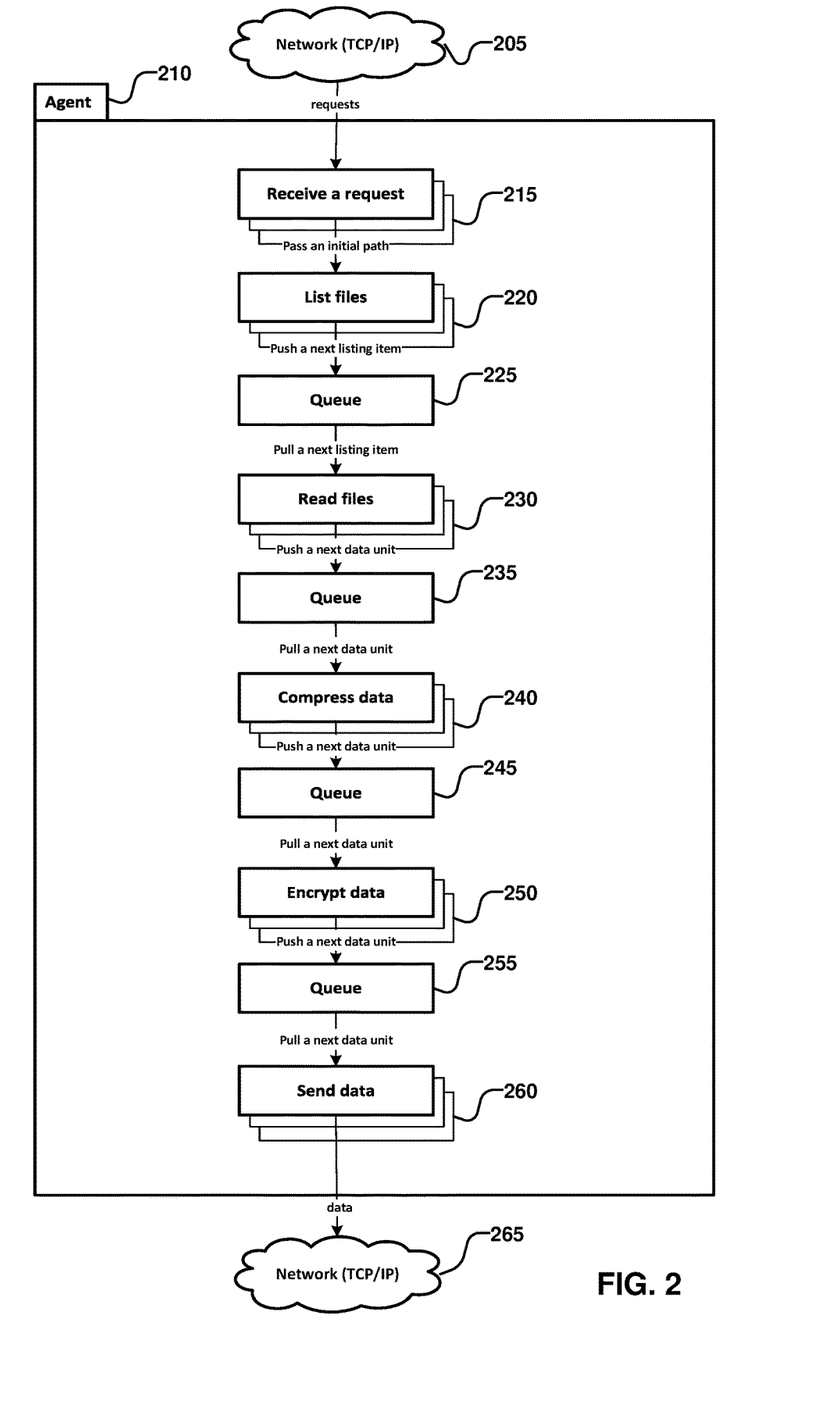
FIG. 2 shows interaction between procedures of the Agent involved in receiving and processing requests from the Client, running in parallel.

FIG. 2 illustrates how the Agent program 115 operates. After starting, the Agent program 115 runs the request receiving procedure 215. The procedure 215 awaits requests from the Client 130. As soon as the first request has been received, the request receiving procedure 215 creates queues 225, 235, 245, 255, and then asynchronously runs a single instance of the file list creation procedure 220, asynchronously runs several instances of each of the procedures for reading 230, compressing 240, encrypting 250 data. At the same time, it asynchronously runs the data transfer procedure 260, with the parameter containing the connection established when the request has been received from the Client 130. The data transfer procedure 260 uses the connection to send the requested data to the Client 130. If further requests to send the same data are received from the Client 130, the request receiving procedure 215 only asynchronously runs additional instances of the data transfer procedure 260, thus utilizing additionally established connections. The file list creation procedure 220 can also asynchronously run its extra instances, if necessary, so that the file list is generated by several procedures working in parallel. Information about files, which have been found, is put into the common queue 225.

Reading procedures 230 take files, which have been found, from the queue 225, divide their contents, uploaded from the local data storage 110, into units of specified maximum length, and put these units into the next queue 235. Data compression procedures 240 take data units from the queue 235, compress them and then put them into the next queue 245. Data encryption procedures 250 take data units from the queue 245, encrypt them and then put them into the next queue 255. Data transfer procedures 260 take data units from the queue 255 and send them to the Client 130 via the network. File list creating procedures 220 stop working as soon as they finish the file search. The last procedure 220 to finish marks the queue for the found files as "closed"; the same goes for procedures 230, 240, 250 and their corresponding queues 235, 245, 255. An attempt made to take an element from an empty queue marked as "closed" does not block procedures 230, 240, 250, 260, but tells them to stop working. Data transfer procedures 260 close network connections upon completion.

Figure 3:
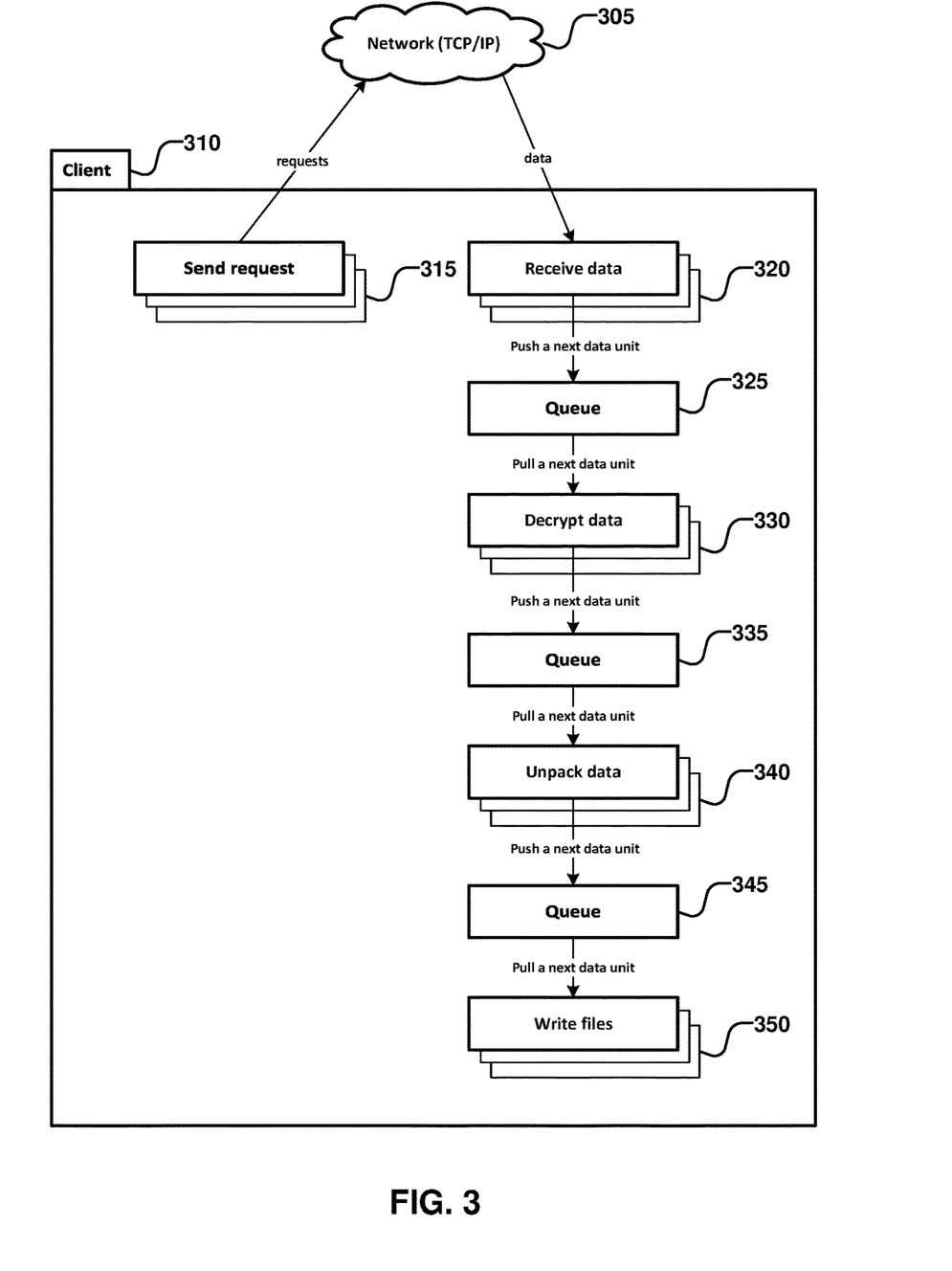
FIG. 3 shows interaction between procedures of the Client involved in sending requests to the Agent and processing data received from the Agent, running in parallel.

FIG. 3 illustrates how the Client 130 operates. After the start, the Client 130 creates queues 325, 335, 345 and sends several requests to send the same set of data 315 to the Agent program 115. At the same time, it asynchronously runs the following procedures for receiving data 320, decrypting data 330, unpacking data 340 and writing data 350. At the start, data receiving procedures 320 receive a parameter with the connections established during sending requests to the Agent 115. Data receiving procedures 320 receive data units from the Agent program 115 via a network and put them into the queue 325. Data decryption procedures 330 take data units from the queue 325, decrypt them and then put them into the next queue 335. Data unpacking procedures 340 take data units from the queue 335, unpack them and then put them into the next queue 345. Data writing procedures 350 take data units from the queue 345, then create files and folders based on the data received, and finally, store file contents in the local storage 125. Data receiving procedures 320 stop working as the Agent program 115 closes network connections. The last procedure 320 to finish marks the queue 325 as "closed"; the same goes for procedures 330 and 340, and their corresponding queues 335, 345. An attempt made to take an element from an empty queue marked as "closed" does not block procedures 330, 340, 350, but tells them to stop working. The last data writing procedure 350 to finish signals the Client 130 to stop working.

Figure 4:
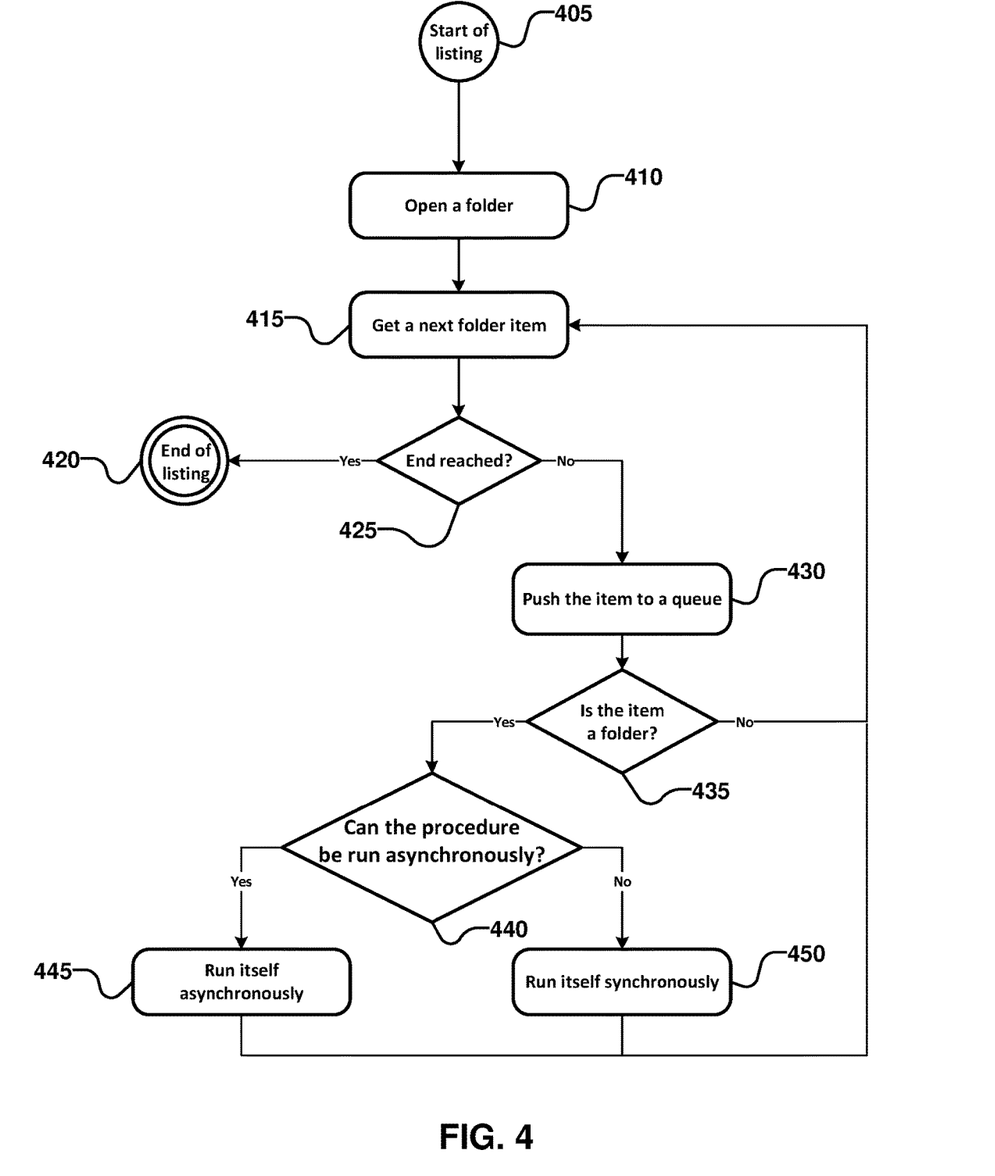
FIG. 4 shows an algorithm for creating a file list by the Agent.

FIG. 4 illustrates how the file list creation procedure 220 of the Agent program 115 works. The parameter for this procedure is the folder path, where a recursive search has to be made. The procedure opens said folder 410 and consecutively reads its contents 415. All elements in the folder, which have been read, are put into the queue 225 (block 430). If the currently processed element is a file (condition 435), the procedure goes on to process the next element. If the currently processed element is a folder (condition 435), then a new instance of the procedure 220 is run either synchronously 450 or asynchronously 445. Whether a new instance can be run asynchronously 445, is limited by the number of currently running instances of the procedure 220 working in parallel. Note that all procedures running asynchronously are working in parallel. Having read the entire contents of the folder, the procedure 220 stops 420.

Figure 5:
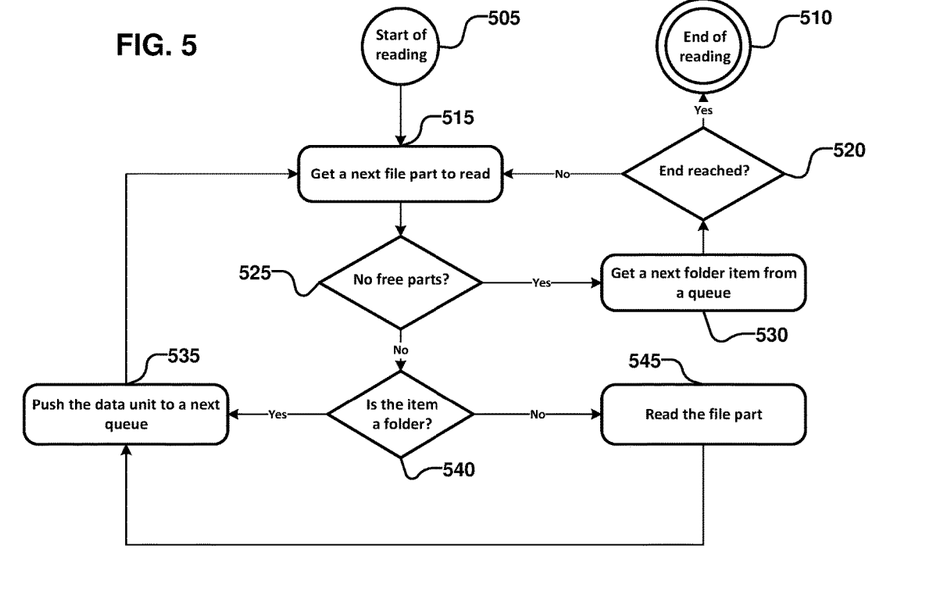
FIG. 5 shows an algorithm for reading file contents by the Agent.

FIG. 5 illustrates how the reading procedure 230 of the Agent program 115 works. Before reading, each uploaded file is divided into units of a specified maximum length. The procedure 230, receiving the parameters of the next unit 515, checks its type 540. If the processed unit is a folder, its information is immediately put into the next queue 235 (block 535). If the processed unit is a file, its contents are uploaded from the local storage 110 (block 545) and its information is put into the queue 235 (block 535). In case there are no undistributed units 525, the procedure 230 takes 530 the next element from the queue 225 and processes it. In case there is no elements in the queue 225 and the queue is marked as "closed" (condition 520), the procedure stops 510. Blocks 515, 525, 530 are synchronized between all currently running instances of the procedure 230. The algorithm goes on to the next file only after all yet unread units of the current file have been distributed among the procedure instances, which allows to upload several units from the same file simultaneously.

Figure 6:
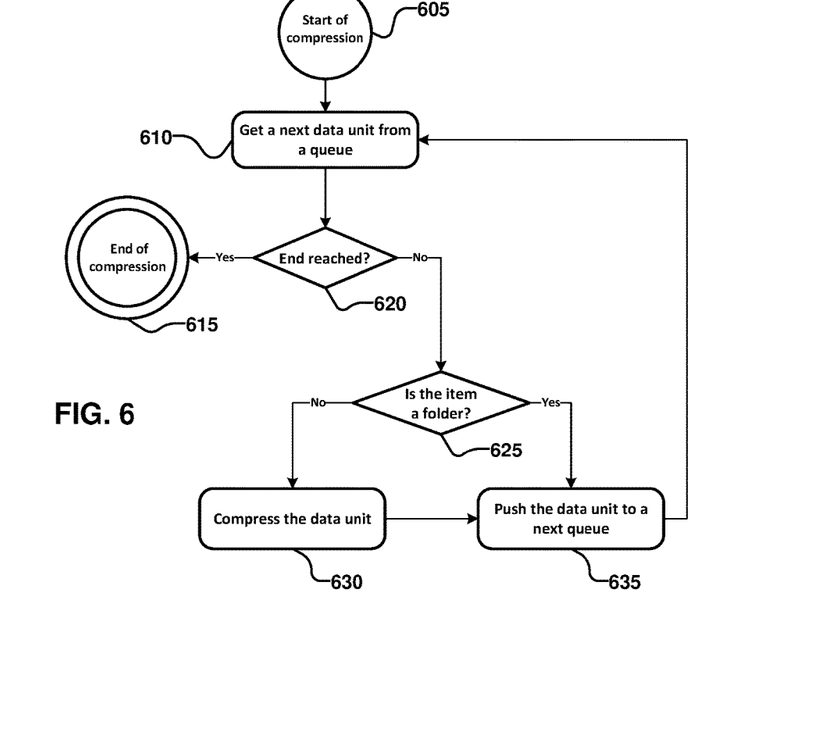
FIG. 6 shows an algorithm for compressing data by the Agent.

FIG. 6 illustrates how the data compression procedure 240 of the Agent program 115 works. The procedure 240 takes data units from the queue 235 (block 610). If the processed unit is a file (condition 625), its data is compressed 630, and the unit is put into the next queue 245 (block 635). If the processed unit is a folder (condition 625), it is put into the next queue 245 (block 635), immediately, without compression.

Figure 7:
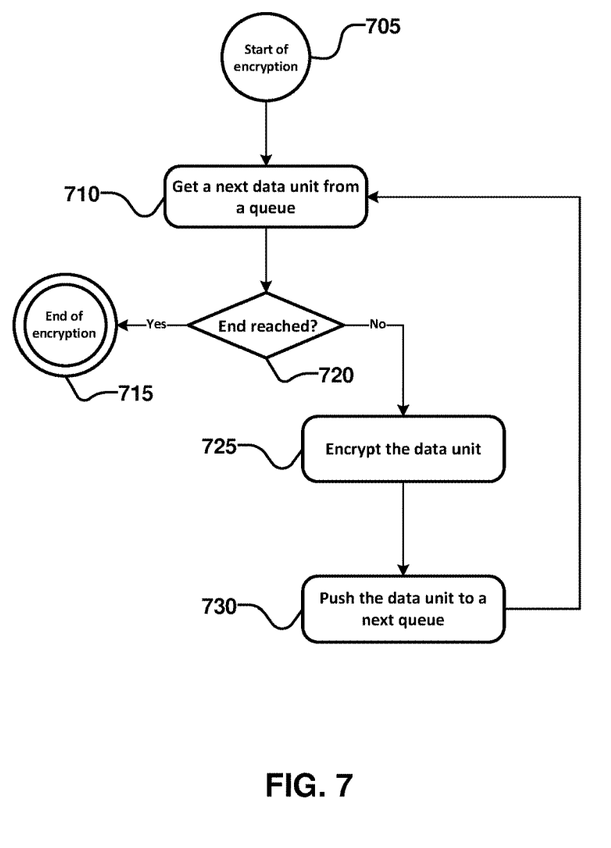
FIG. 7 shows an algorithm for encrypting data by the Agent.

FIG. 7 illustrates how the data encryption procedure 250 of the Agent program 115 works. The procedure 250 takes data units from the queue 245 (block 710), encrypts 725 them, and puts them into the next queue 255 (block 730).

Figure 8:
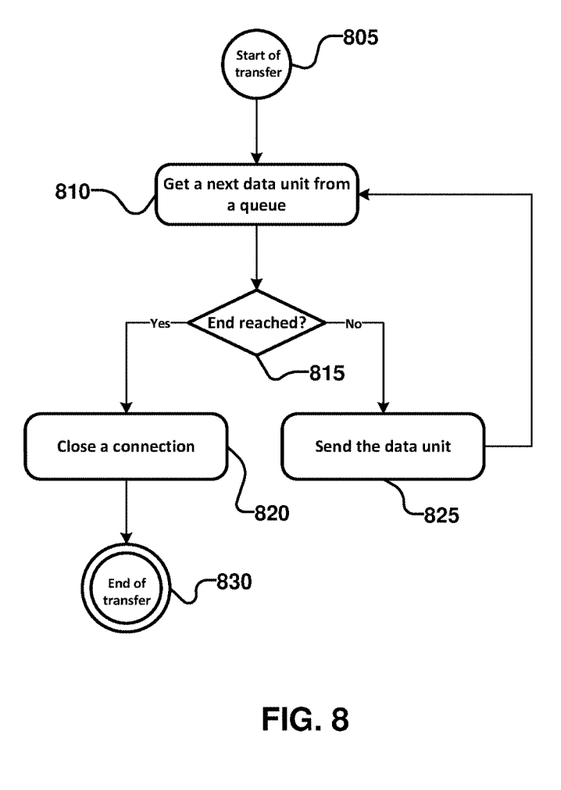
FIG. 8 shows an algorithm for transferring data by the Agent.

FIG. 8 illustrates how the data transfer procedure 260 of the Agent program 115 works. The procedure 260 takes data units from the queue 255 (block 810) and transvers them to the Client 130 via the network 825 using the network connection established, when the request from the Client 130 has been received. When the procedure 260 finishes its work, it closes the connection 820.

Procedures 240, 250, 260 stop on the condition (conditions 620, 720, 815) that there is no elements in queues 235, 245, 255, which are marked as "closed".

Figure 9:
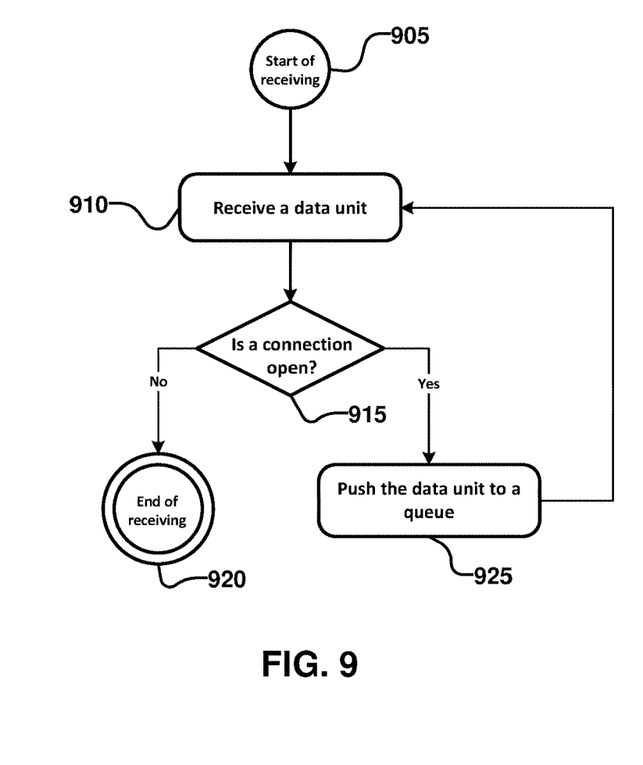
FIG. 9 shows an algorithm for receiving data by the Client.

FIG. 9 illustrates how the data receiving procedure 320 of the Client 130 works. The procedure 320 receives data units from the Agent program 115 (block 910) and puts them into the queue 325 (block 925). The data is received via the network connection established, when the request 315 has been sent to the Agent program 115. The procedure 320 stops (block 920) after receiving a notification that the Agent 115 (condition 915) has closed the connection.

Figure 10:
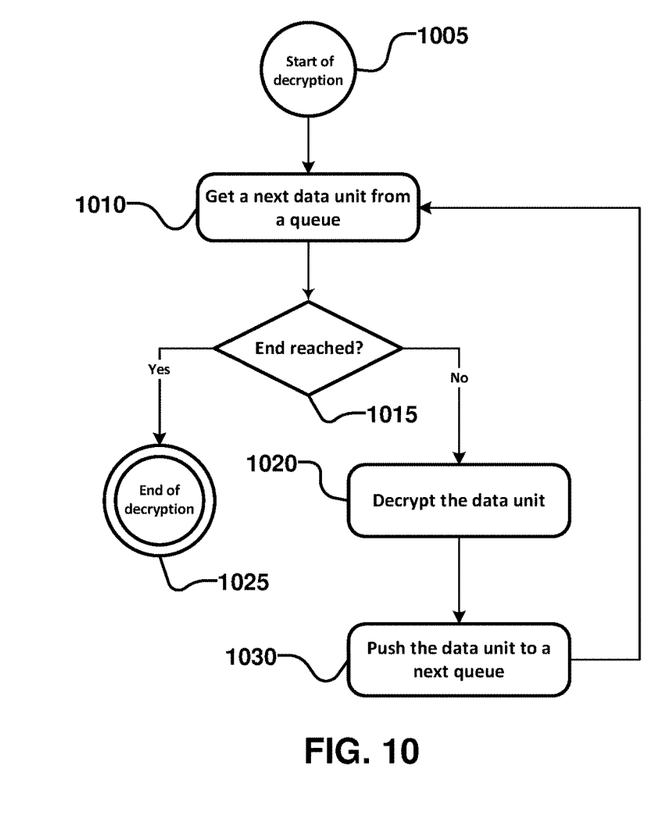
FIG. 10 shows an algorithm for decrypting data by the Client.

FIG. 10 illustrates how the data decryption procedure 330 of the Client 130 works. The procedure 330 takes data units from the queue 325 (block 1010), decrypts 1020 them, and puts them into the next queue 335 (block 1030).

Figure 11:
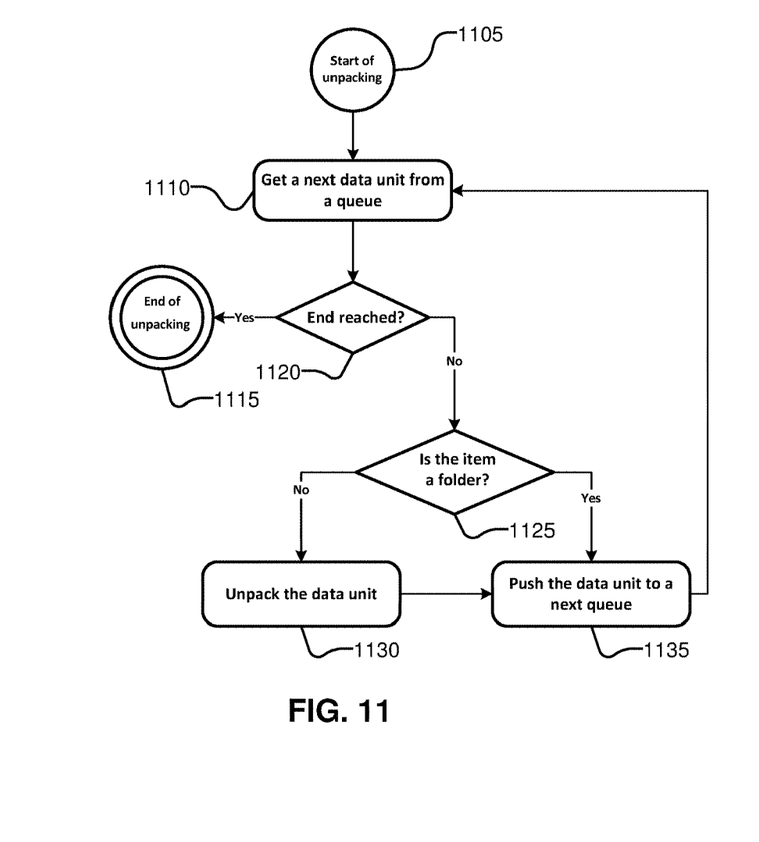
FIG. 11 shows an algorithm for unpacking data by the Client.

FIG. 11 illustrates how the data unpacking procedure 340 of the Client 130 works. The procedure 340 takes data units from the queue 335 (block 1110). If the processed unit is a file (condition 1125), its data are unpacked 1130, and the unit is put into the next queue 345 (block 1135). If the processed unit is a folder (condition 1125), it is put into the next queue 345 (block 1135) immediately, without unpacking.

Figure 12:
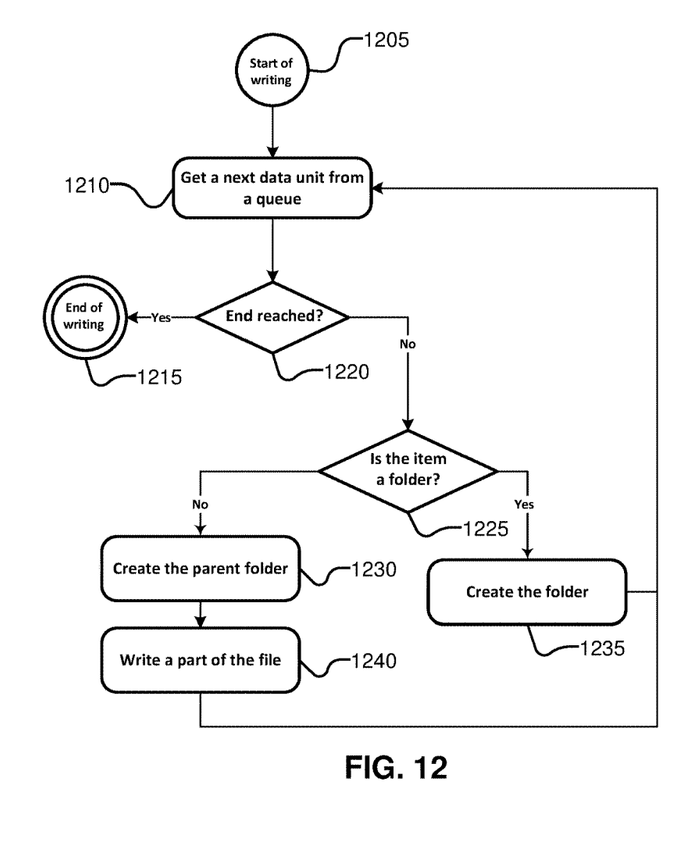
FIG. 12 shows an algorithm for writing file contents by the Client.

FIG. 12 illustrates how the data writing procedure 350 of the Client 130 works. The parameter for this procedure is the path to the root folder, where all files and folders transferred from the source server 105 will be created. The procedure 350 takes data units from the queue 345 (block 1210). If the processed unit is a folder (condition 1225), the procedure creates it and its parent folders in the root folder (provided those folders have not been created before) (block 1235). If the processed unit is a file (condition 1225), the procedure creates its parent folder 1230 using the same algorithm as 1235, as well as the file itself (provided it has not been created before), and then writes a received data unit in said file with the necessary offset (block 1240). Blocks 1230, 1235, 1240 are synchronized between all currently running instances of the procedure 350. Such algorithm ensures that all data are correctly saved regardless of the order they have been received in.

Procedures 330, 340, 350 stop on the condition (conditions 1015, 1120, 1220) that there is no elements in queues 325, 335, 345, which are marked as "closed".

Figure 13:
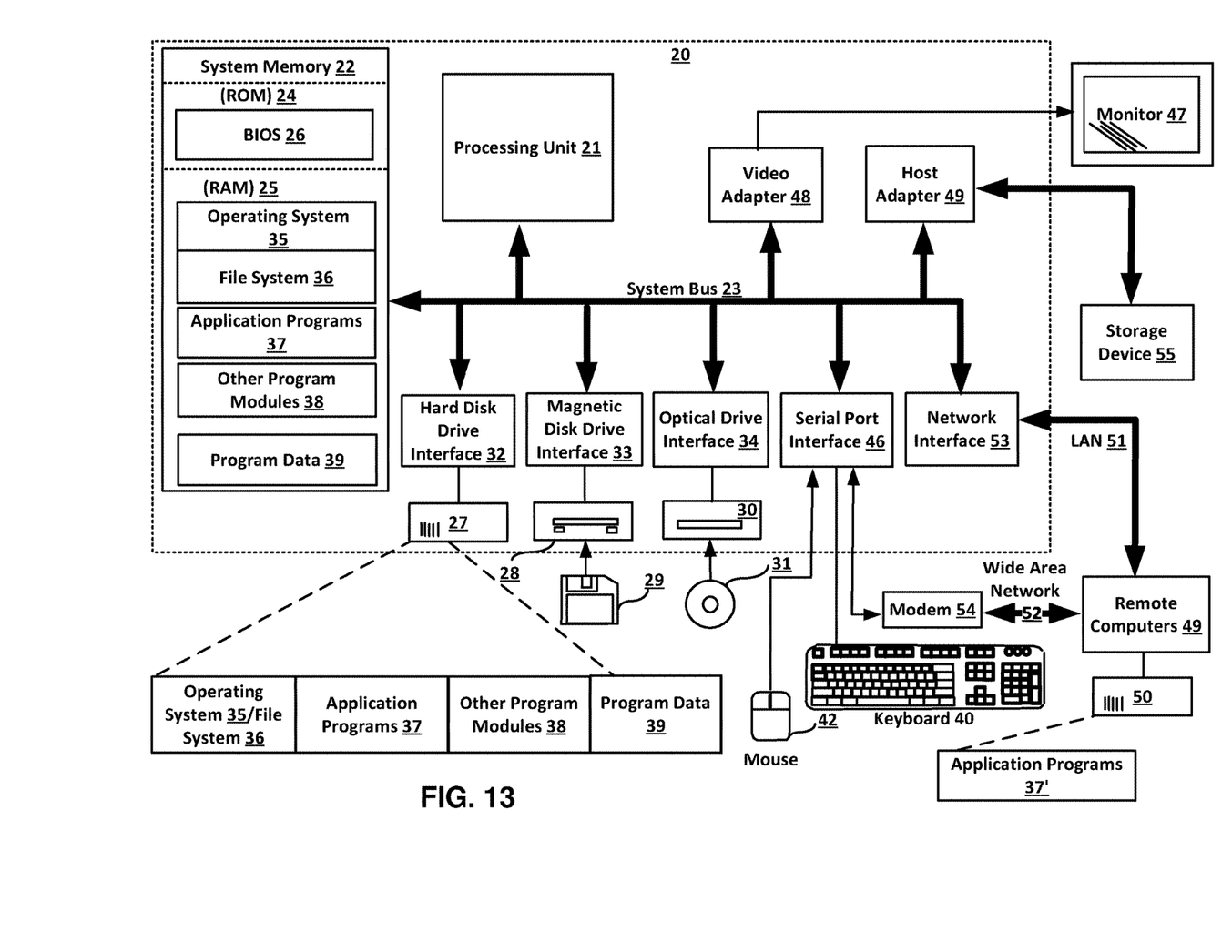
FIG. 13 illustrates a computer or server that may be used to implement the invention.

With reference to FIG. 13, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 20 includes a file system 36 associated with or included within the operating system 35, such as the Windows NT™ File System (NTFS), one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A system for transferring files, comprising:
    a source server having a local source data storage;
    a target server having a local target data storage and connected to the source server via a network;
    an agent program running on the source server;
    a client program running on the target server;
    wherein the client program initiates a data transfer by sending several successive requests to the agent program, the requests including a path to data to be transferred on the local source data storage;
    wherein a number of the requests equals a number of network connections used to receive the data from the source server;
        the agent program receives the requests from the client program, uploads the data from the local source data storage and transfers the data via the network to the client program;
        the client program receives the data from the agent program and stores the data on the local target data storage; and
        a file transfer process is divided into multiple file copy operations;
    wherein all the file copy operations are performed through separate procedures;
    wherein each file copy operation is executed by multiple procedures working in parallel and independent of each other;
    wherein parts of each file and file metadata are transferred between the procedures via limited size queues, with the queues being arranged arbitrarily and in no particular order relative to each other;
    wherein each procedure is blocked when it adds data to a queue when the queue reaches a maximum predetermined size;

wherein each procedure is blocked when it attempts to extract data from the queue if the queue is empty and not marked as closed;

the agent program initiates a file list generation procedure to define a list of files to be transferred, with the file list generation procedure asynchronously launching copies of itself to generate the list of files in parallel; and the agent program reads a next file from the list of files only when all blocks of a current file are distributed between the file copy operations.

2. The system of claim 1, wherein the agent program performs the following:

awaits requests from the client program;

upon receipt of a request, creates queues;

asynchronously runs a single instance of a file list creation procedure;

asynchronously runs several instances of reading procedures;

compresses the data;

encrypts the data;

asynchronously runs a data transfer procedure using the network connections, wherein a parameter containing a network connection is established when the request has been received from the client program;

asynchronously runs additional instances of the data transfer procedure if additional requests are received, utilizing additionally established network connections;

wherein the file list is generated by several procedures working in parallel;

wherein information about files, which have been found, is put into common queue;

divides file contents into units of specified maximum length, and places the units into a next queue.

3. The system of claim 2, wherein the file list creating procedures run asynchronously.

4. The system of claim 1, wherein the data is encrypted prior being transferred, and wherein each encryption routine for each data transfer procedure is asynchronous and independent of others.

5. The system of claim 1, wherein the data is compressed prior to being transferred, and wherein each compression routine for each data transfer procedure is asynchronous and independent of others.

6. The system of claim 1, wherein the agent program transfers the data in a random order.

7. The system of claim 1, wherein the agent program transfers the data in an arbitrary order.

8. The system of claim 1, wherein, once all data is transferred, the agent program closes all network connections to the target server, thereby notifying the client program that the data transfer has been completed.

9. The system of claim 1, wherein the client program performs the following:

creates queues and sends several requests to send the same set of data to the agent program;

asynchronously runs data receiving procedures, decryption procedures, unpacking procedures and data writing procedures;

the data receiving procedures receive a parameter with the network connections established during the sending of the requests to the agent program;

the data receiving procedures receive data units from the agent program via the network and put the data units into the queue;

the data decryption procedures decrypt the data units from the queue and put the decrypted data unites in a next queue;

the data unpacking procedures take the data units from the queue, unpack the data units and put the data units into the next queue;

the data writing procedures take the data units from the queue, and create files and folders based on the data received, and then store file contents in the local storage of the target server.

10. The system of claim 1, wherein the agent program and the client program perform all low-level file operations locally.

11. The system of claim 1, wherein multiple network connections are maintained to transfer requests from the client program to the agent program.

12. A method for transferring files, comprising:

on a source server having a local source data storage, starting an agent program;

on a target server having a local target data storage and connected to the source server via a network, starting a client program running;

initiating a data transfer from the client program by sending several successive requests to the agent program, the requests including a path to data to be transferred on the local source data storage;

wherein a number of the requests equals a number of network connections used to receive the data from the source server;

in the agent program, receiving the requests from the client program, uploading the data from the local source data storage and transferring the data via the network to the client program;

in the client program, receiving the data from the agent program and storing the data on the local target data storage;

dividing a file transfer process into multiple file copy operations, wherein all the file copy operations are performed through separate procedures, and wherein each file copy operation is executed by multiple procedures working in parallel and independent of each other;

wherein parts of each file and file metadata are transferred between the procedures via limited size queues, with the queues being arranged arbitrarily and in no particular order relative to each other;

blocking each procedure when it adds data to a queue when the queue reaches a maximum predetermined size;

blocking each procedure when it attempts to extract data from the queue if the queue is empty and not marked as closed;

in the agent program, initiating a file list generation procedure to define a list of files to be transferred, with the file list generation procedure asynchronously launching copies of itself to generate the list of files in parallel, and in the agent program, reading a next file from the list of files only when all blocks of a current file is distributed between the file copy operations.

* * * * *